United States Patent [19]

Hemmi et al.

[11] 4,100,548
[45] Jul. 11, 1978

[54] BIFOCAL PILLBOX ANTENNA SYSTEM

[75] Inventors: Christian Otto Hemmi, Dallas; Oren Byrl Kesler, Richardson; Richard Thomas Dover, Dallas, all of Tex.

[73] Assignee: The United States of America as represented by the Secretary of the Department of Transportation, Washington, D.C.

[21] Appl. No.: 728,086

[22] Filed: Sep. 30, 1976

[51] Int. Cl.² .............................................. H01Q 3/26
[52] U.S. Cl. ..................................... 343/837; 343/854; 343/100 SA
[58] Field of Search ................. 343/780, 854, 100 SA, 343/756, 837

[56] References Cited

U.S. PATENT DOCUMENTS

| 2,549,721 | 4/1951 | Straus et al. | 343/780 |
| 3,568,207 | 3/1971 | Boyns et al. | 343/854 |
| 3,775,769 | 11/1973 | Heeren et al. | 343/854 |
| 3,852,762 | 12/1974 | Henf et al. | 343/780 |
| 3,914,765 | 10/1975 | Litt et al. | 343/854 |
| 3,945,009 | 3/1976 | Trigon | 343/780 |

FOREIGN PATENT DOCUMENTS 604,700  9/1960  Canada ................. 343/780

Primary Examiner—Eli Lieberman
Attorney, Agent, or Firm—Alva H. Bandy; Harold P. Deeley, Jr.; Otto M. Wildensteiner

[57] ABSTRACT

A bifocal pillbox antenna system is disclosed comprising a controller means providing control voltages and sequential switching signals to scan circuits. The scan circuits provide RF energy selectively to feed elements of a contoured feed array for radiation in a waveguide means. The waveguide means includes a waveguide and a pair of reflectors specially shaped to provide a pair of spaced focal points. The energy radiating from the feed elements with a non-linear phase distribution is guided to the specially shaped reflectors and reflected with a nearly linear phase distribution for transmission.

14 Claims, 20 Drawing Figures

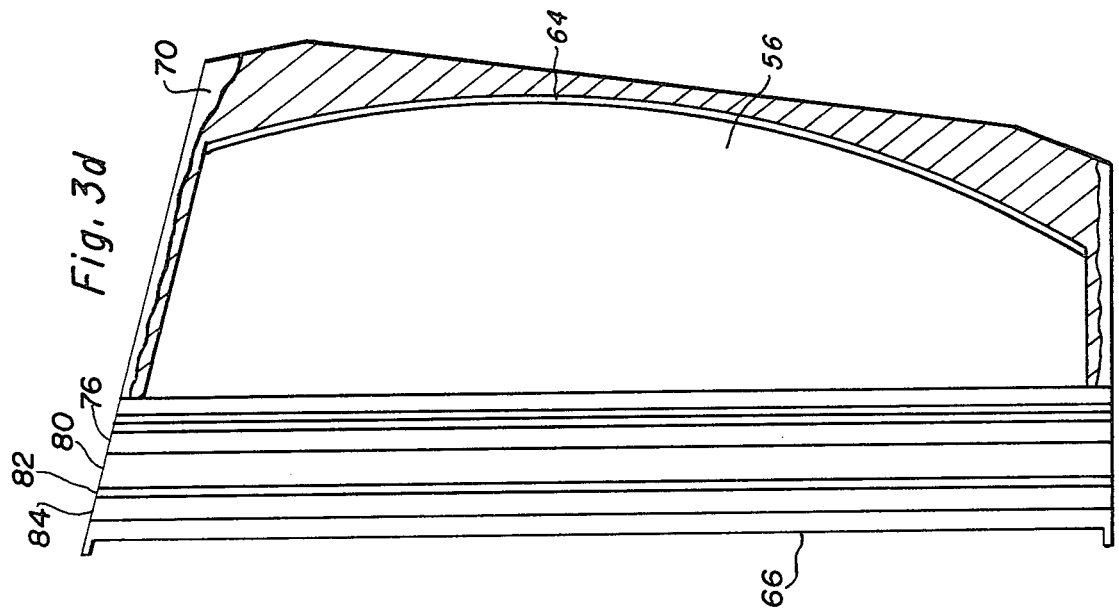
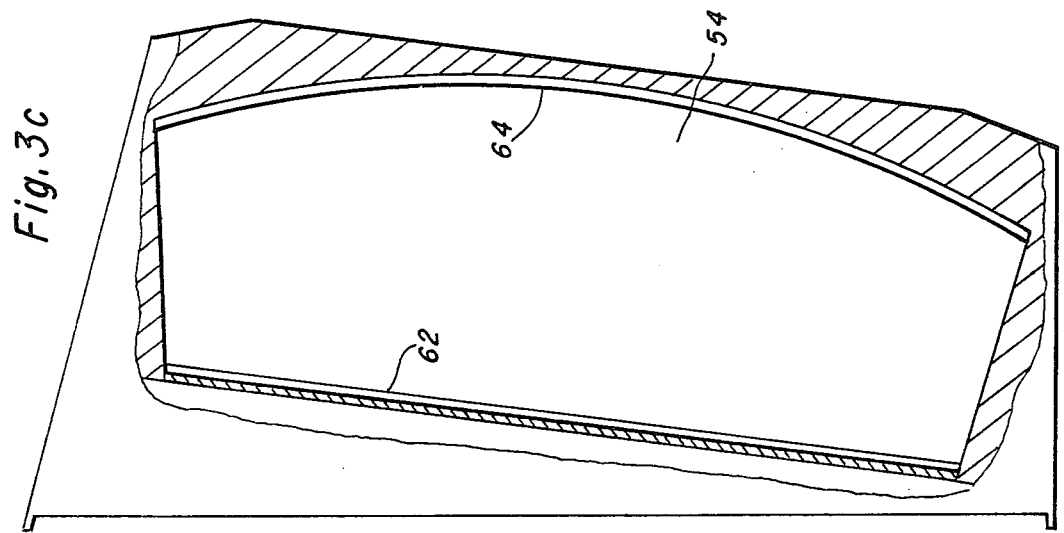

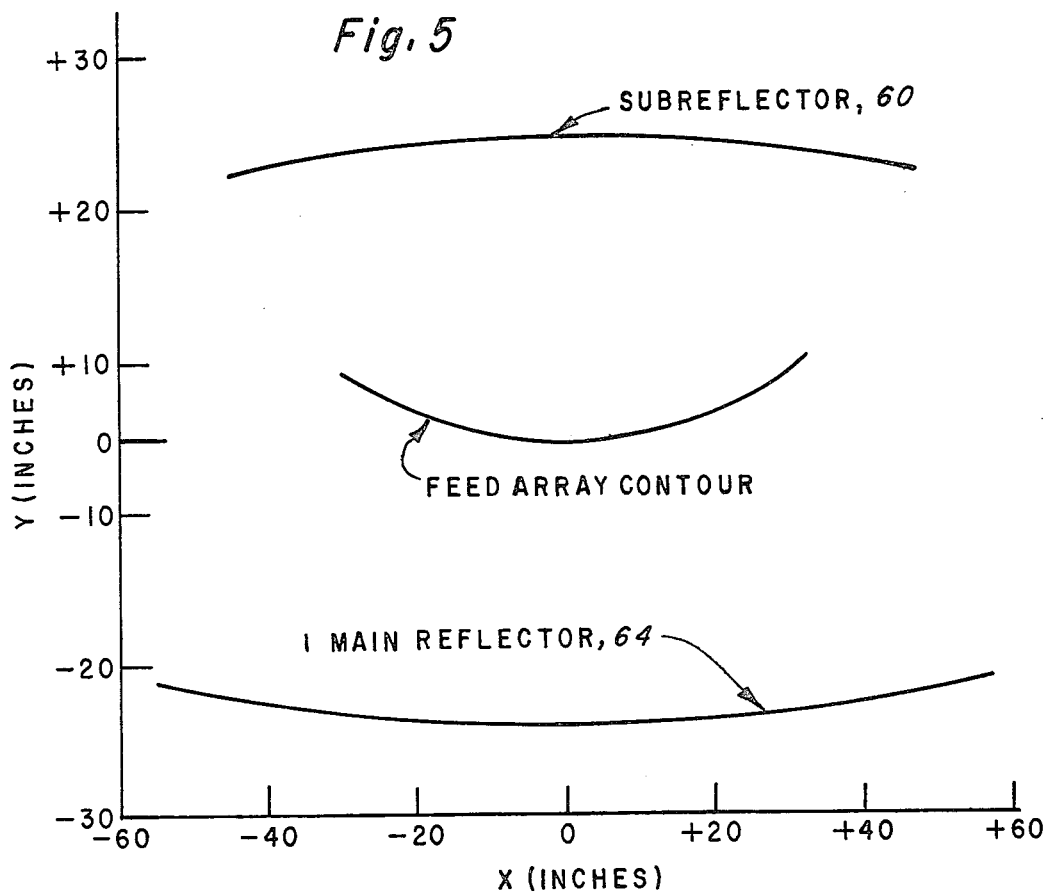
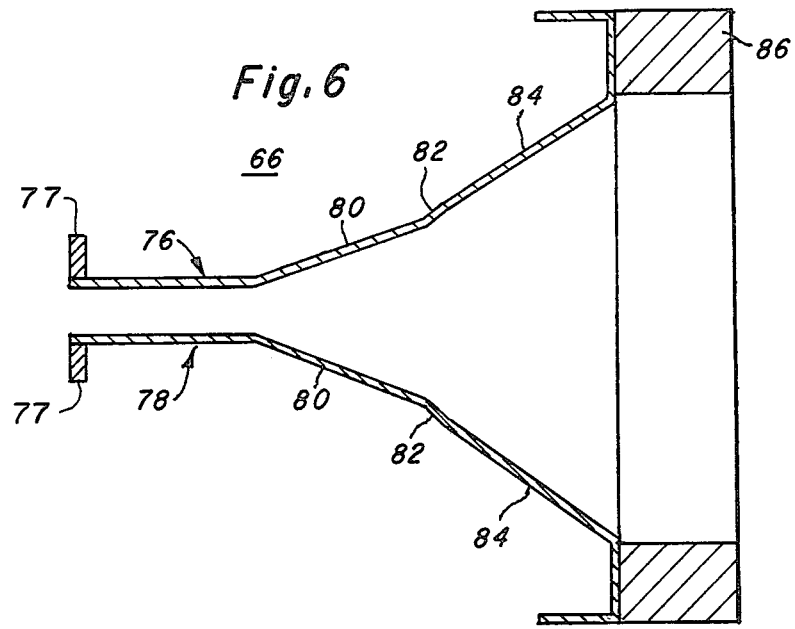

(a) 0° EL.

(b) 3° EL.

(a) 5° EL.

(b) 10° EL.

(a) 15° EL.

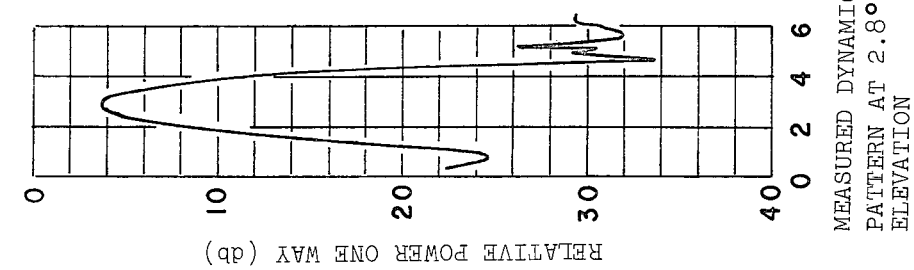
Fig. 8b MEASURED DYNAMIC PATTERN AT 2.8° ELEVATION
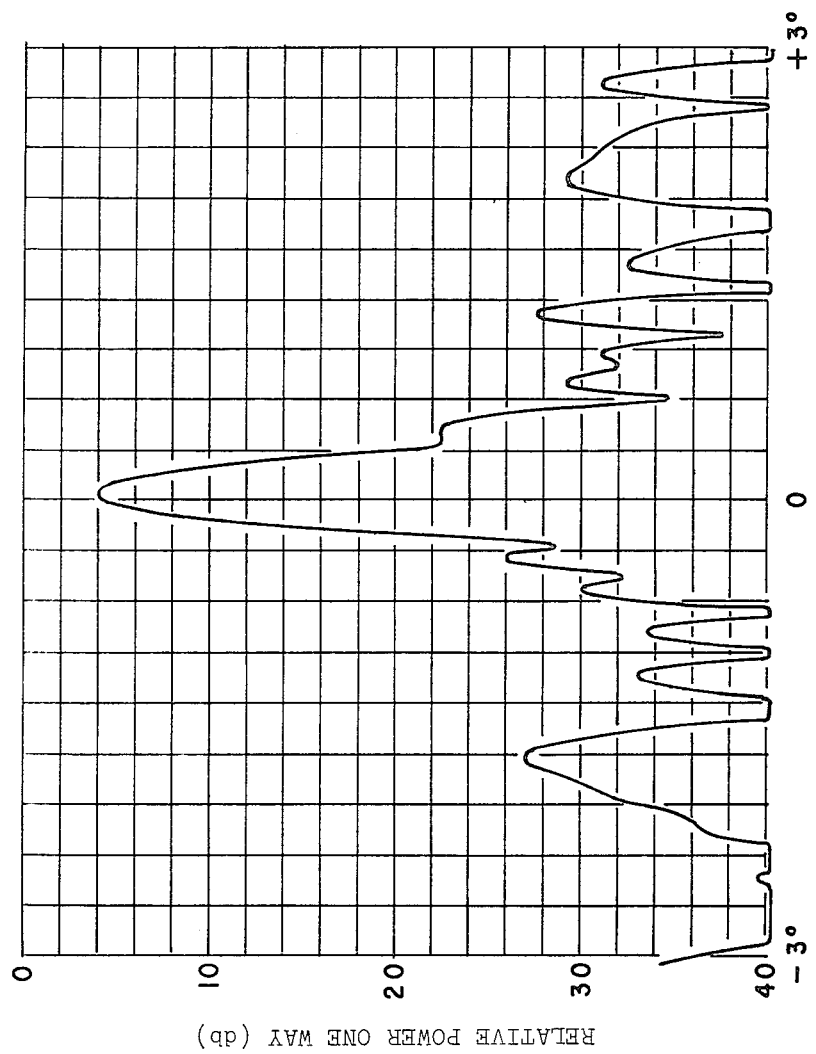
Fig. 8a MEASURED ELEVATION PATTERN AT 0° ELEVATION

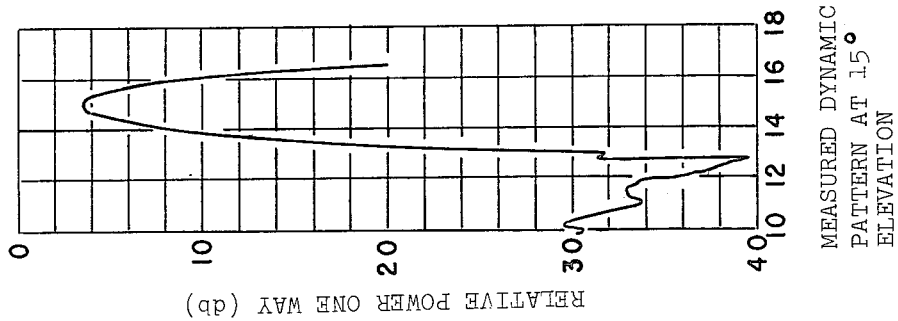
Fig. 8e — MEASURED DYNAMIC PATTERN AT 15° ELEVATION
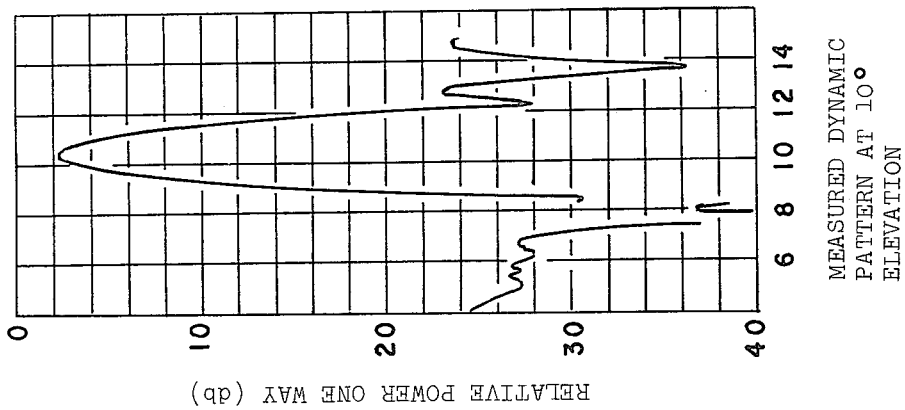
Fig. 8d — MEASURED DYNAMIC PATTERN AT 10° ELEVATION
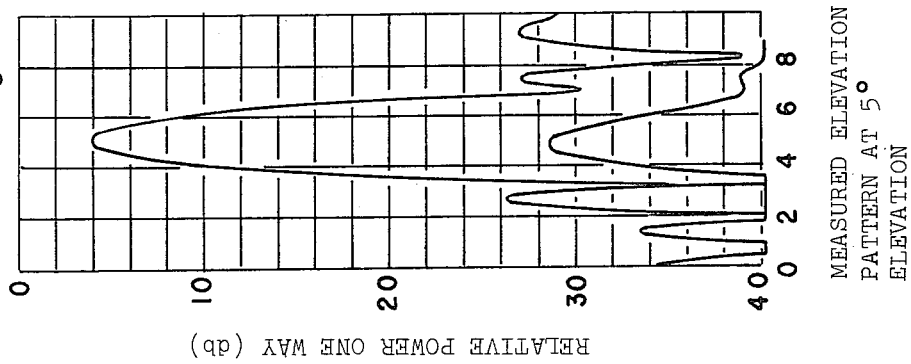
Fig. 8c — MEASURED ELEVATION PATTERN AT 5° ELEVATION

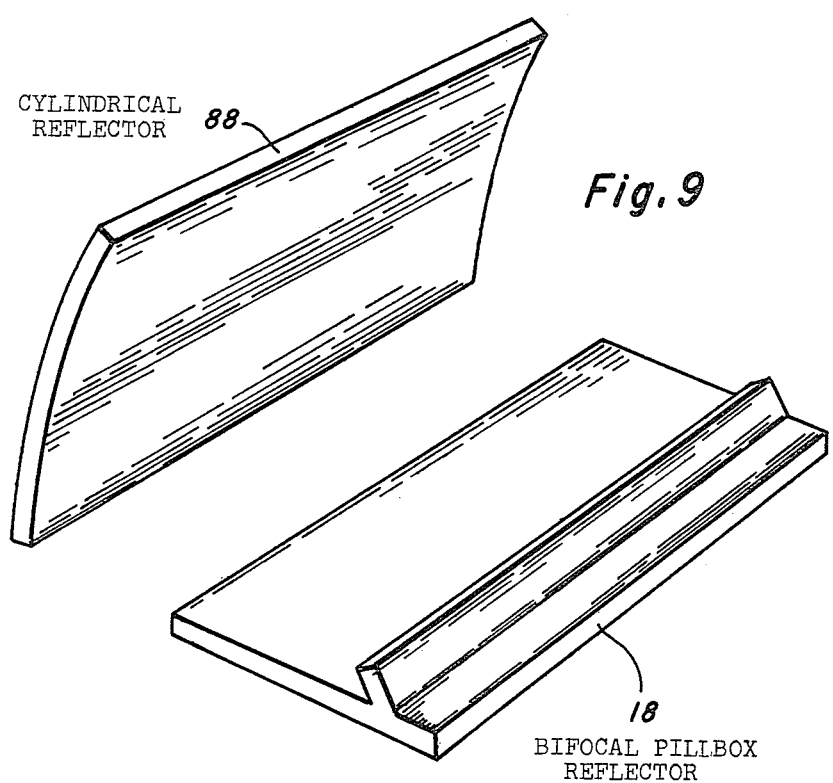

BIFOCAL PILLBOX ANTENNA SYSTEM

This invention relates to an antenna system and more particularly to a bifocal pillbox antenna system.

In the past, an antenna used for applications requiring a high directivity in one plane and a broad pattern in the other plane was the pillbox antenna. The pillbox antenna has a short length of a parabolic-cylindrical antenna the ends of which are closed with metal plates so that the field is confined to a parallel-plate waveguide region. The spacing between the two metal plates was close enough to permit propagation of only one mode in the desired direction of polarization. The efficiency obtainable from a pillbox antenna was as high as eighty percent.

For scanning, the pillbox antenna has been used with a parabolic or cylindrical strip reflector mounted between parallel plates and a rotating feed. More recently, however, a multilayer pillbox antenna with an array of feed elements and a single parabolic reflector has been used to form an electronic step-scanned antenna. It has a 3° half power beamwidth and scans over an 18° angular sector.

A principal disadvantage of a pillbox-parabolic reflector scanning antenna is the coma aberrations which occur when the feed is moved off the parabola focal point. These abberations produce pattern asymmetry and degraded sidelobe levels which become more severe as the scan angle increases. The asymmetries and high sidelobe levels limit the usable scan range.

A principal disadvantage of the multilayer electronically scanned pillbox is that with minus 12 db sidelobes over more than half of the scan range, it will not meet today's aircraft traffic control requirements.

Thus, it is an object of the present invention to provide an improved directional or line source antenna system.

Another object of the invention is to increase the scan range of a directional antenna.

Yet another object of the invention is to provide a directional antenna with reduced sidelobe levels.

Still another object of the invention is to provide a directional antenna with reduced beamwidth size.

Still yet another object of the invention is to provide a bifocal pillbox antenna.

Briefly stated the invention comprises a bifocal pillbox antenna, hereinafter described in detail, having a beamwidth of about 1.5°, a scan sector of 20° and worst case sidelobes of about minus 24.5 db over the scan sector.

These and other objects and features of the invention will become more readily understood in the following detailed description taken in conjunction with the drawings.

Figure 3B:
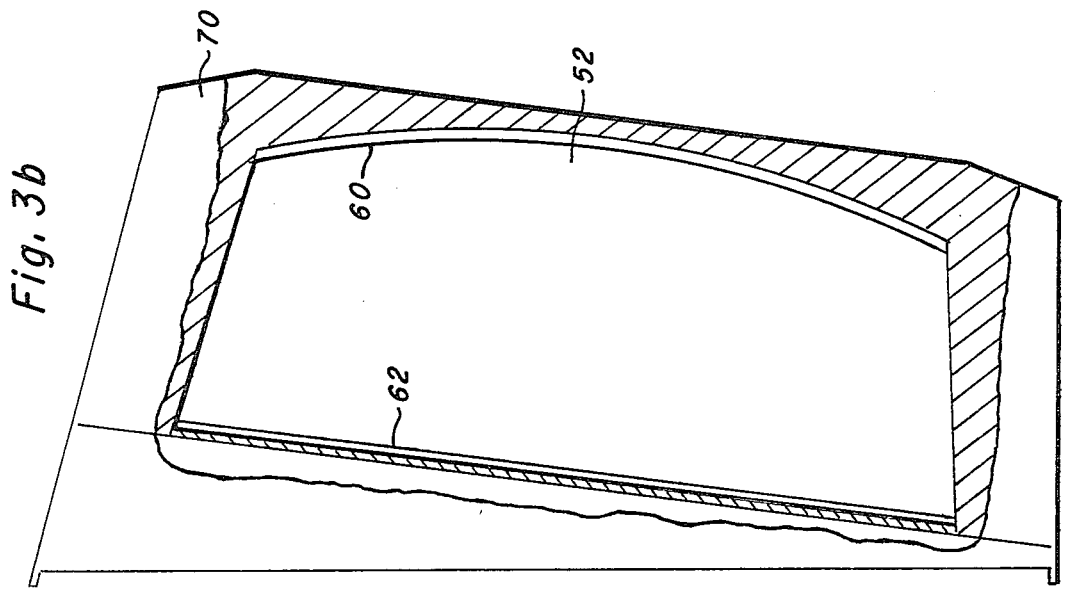
FIG. 3b shows the bifocal pillbox antenna of FIG. 3a with the feed array and first flat panel removed and the top panel of the second channel portion broken away to reveal the interior of the second channel portion.

FIG. 3c shows the bifocal pillbox antenna of FIG. 3b with the second flat panel removed and the top panel of the third channel portion broken away to reveal the interior of the third channel portion; and FIG. 3d shows the bifocal pillbox antenna of FIG. 3c with the third flat panel removed and the top panel of the fourth channel portion broken away to reveal the interior of the fourth channel portion.

Figure 4:
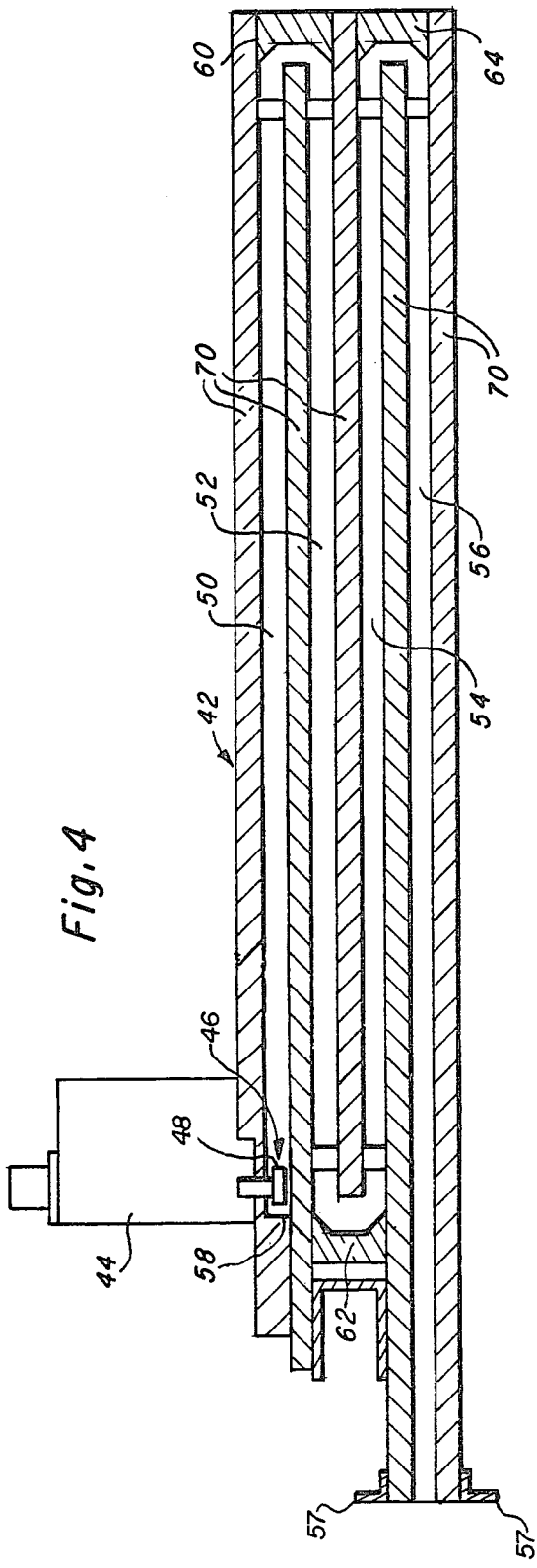
Figure 7A:
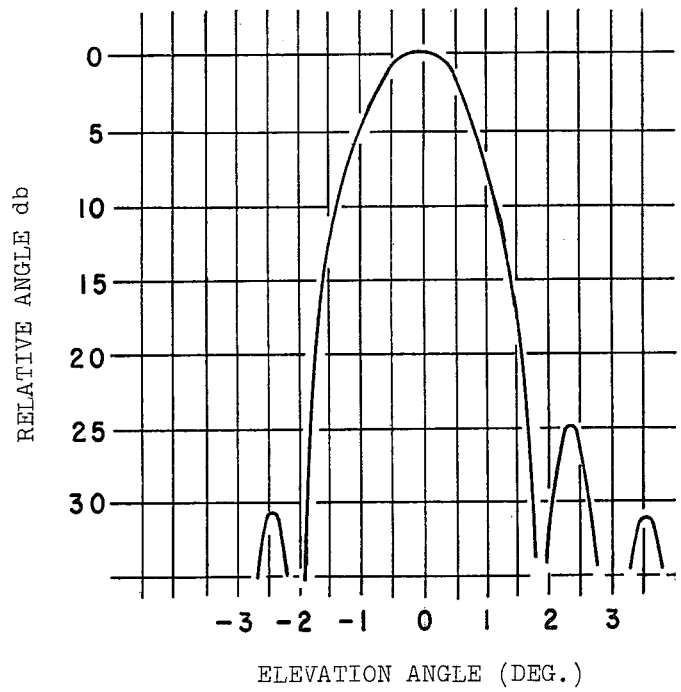
Figure 7B:
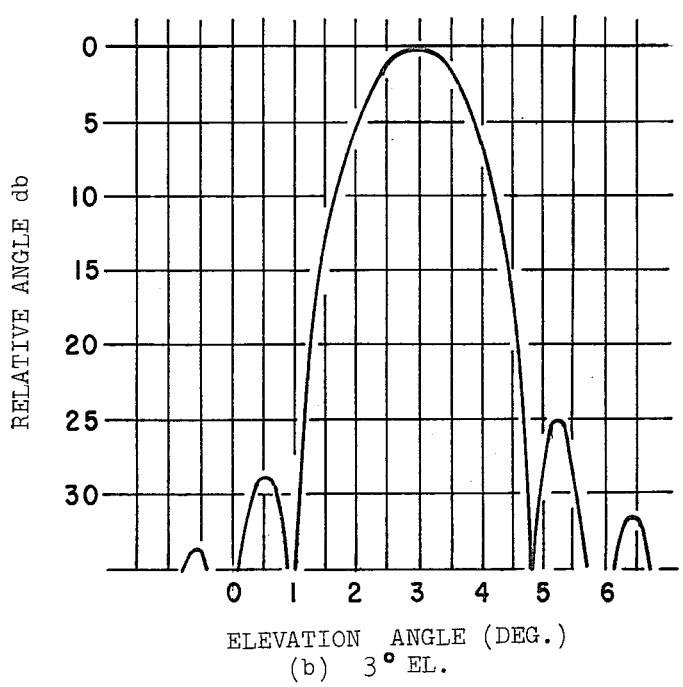
Figure 7C:
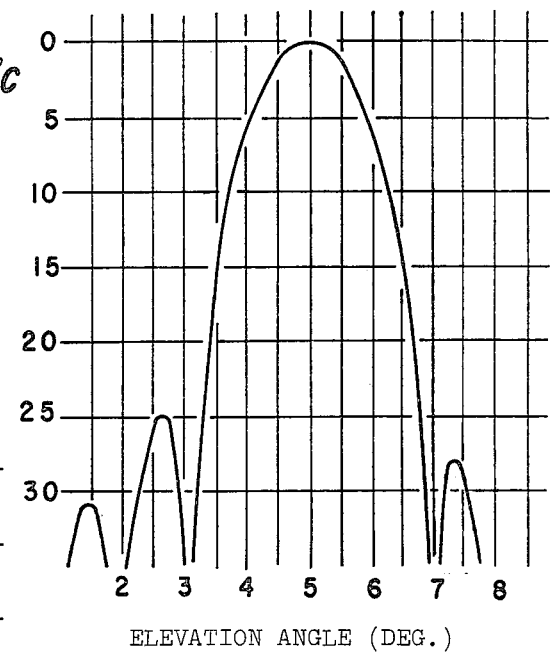
Figure 7D:
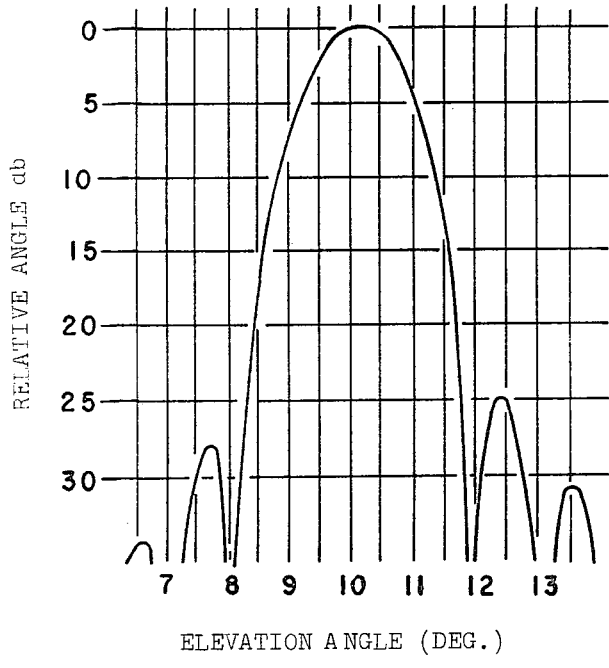
Figure 7E:
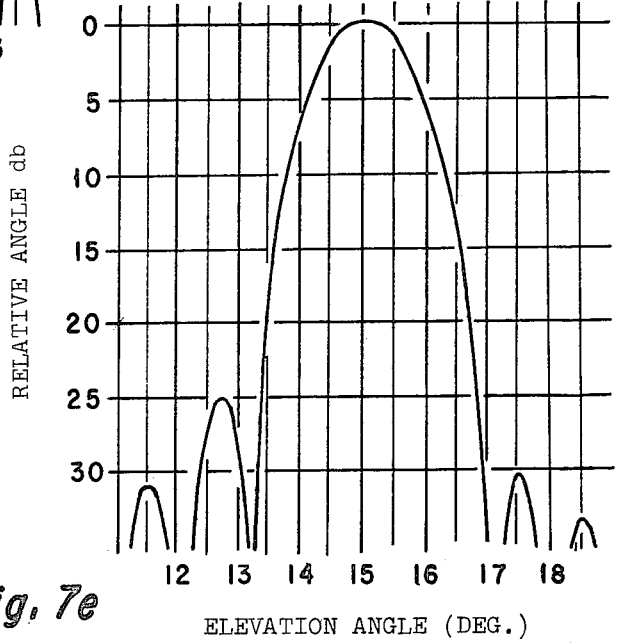

FIG. 4 is a cross-sectional view of the bifocal pillbox antenna with the feed horn removed.

FIG. 5 is a chart of the geometry of the reflectors and feed array for the bifocal pillbox antenna.

FIG. 6 is a cross-sectional view of the parallel plate horn.

FIGS. 7a – e are charts of the calculated elevation patterns at selected degrees of elevation.

FIGS. 8a – e are charts of the measured elevation patterns at preselected degrees of elevation.

FIG. 9 is a second embodiment of the bifocal pillbox antenna.

Figure 1:
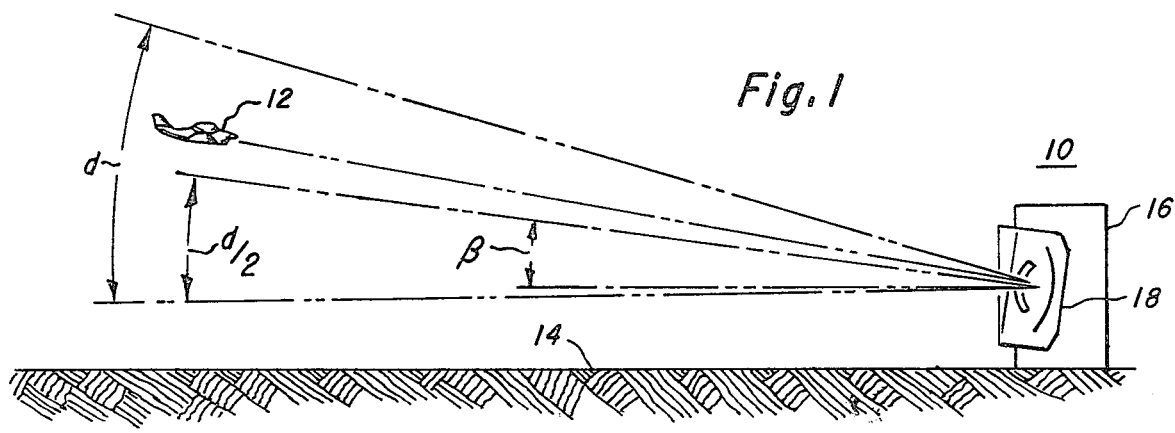
FIG. 1 is a view showing the bifocal pillbox antenna operating in its airport environment.

Referring to the drawings, FIG. 1 shows the bifocal pillbox antenna system 10 operating as an elevation scanner in the elevation guidance sub-system of a microwave landing system. The system 10 is shown guiding an aircraft 12 to a safe landing at airport 14. It will be appreciated by those skilled in the art from the description of the preferred embodiment of the invention that the bifocal pillbox antenna system can be used in many other applications where a scanning beam is required. To land the aircraft 12, the system 10 is operating at a preselected frequency to provide a conical beam pattern scanning a desired angular range $\alpha$ at a preselected scan rate. For example, an antenna system 10, hereinafter described, is provided to radiate a 5.18 GHZ RF signal to scan an angular range of 0° to 20° at a scan rate of 20,000° per second.

The bifocal pillbox antenna system 10 comprises a housing 16 for electronic equipment and a pillbox antenna 18. The electronic equipment includes the power pack, controller, and scan circuits. The bifocal pillbox antenna 18 is electrically attached to the scan circuit of housing 16, and tilted upwardly at a preselected angle $\beta$.

Figure 2:
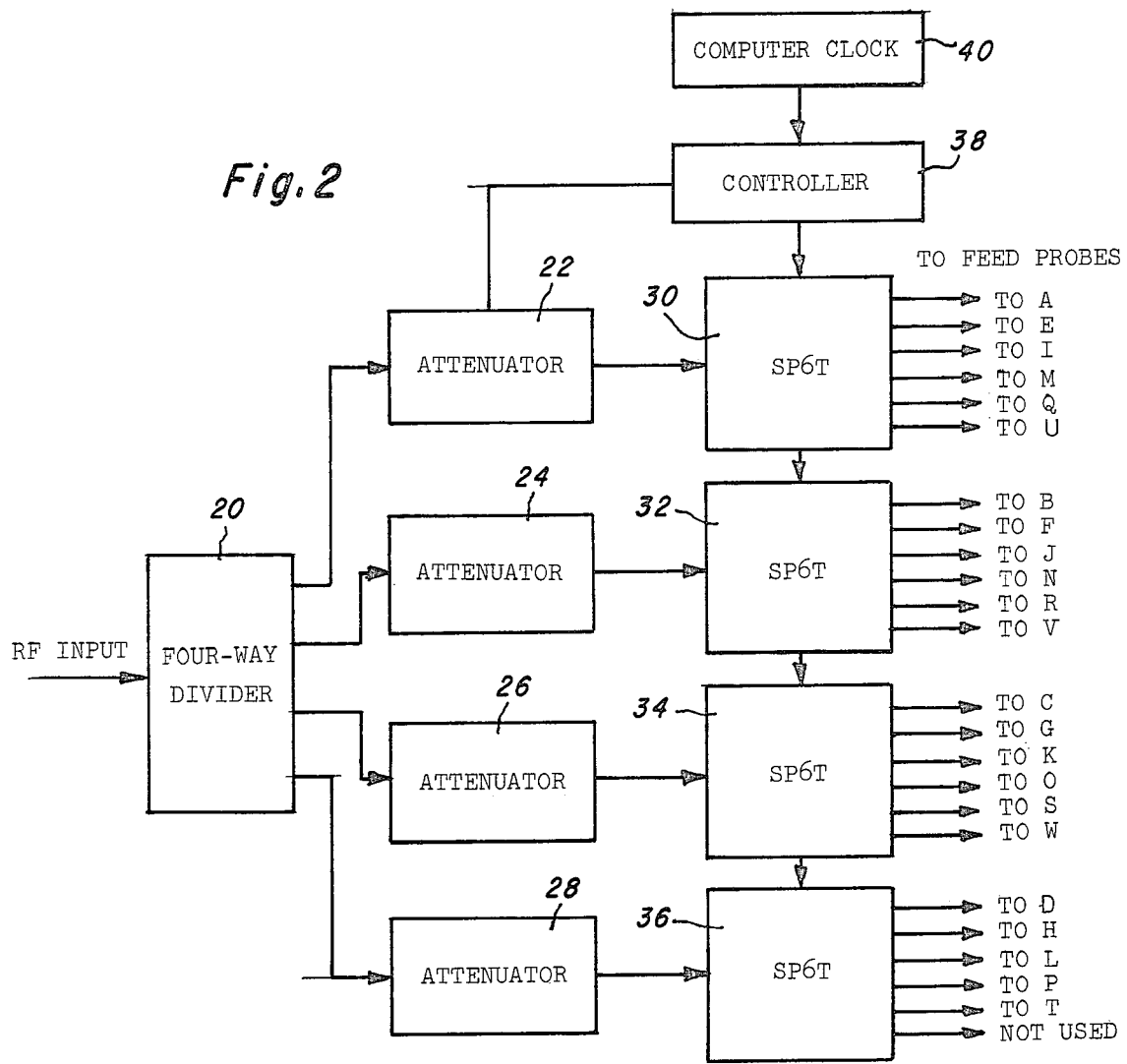
FIG. 2 is a block diagram of the scan circuits for the feed array.

Referring to FIG. 2 for a description of the scan circuits, RF energy from a source thereof (not shown) is coupled to a four-way power divider 20. The outputs of the four-way power divider are connected to four electronically controlled attenuators 22, 24, 26 and 28. Four single-pole-six-throw switches 30, 32, 34 and 36 are connected, respectively, to the four electronically controlled attenuators.

The electronically controlled attenuators 22–28 and switches 30–36 of the scan circuits are selectively energized by a controller 38. A clock 40 provides timing signals to the controller 38. The controller includes in one circuit a read-only memory (ROM) coupled to a digital-to-analog (D/A) converter and in another circuit a plurality of shift registers. The ROM is programmed to operate the digital-to-analog converter to provide stepped voltage amplitude signals, for example, 0 to 10 volts and, if desired, back to 0 volts in a time sequence to attenuators 22 – 28. Thus, the electronic attenuators 22–28 are cycled so that the relative RF voltage available for element Z, i.e., any one of the elements A–W, is:

$$V_Z(t) = \cos^2(\pi t/200 - \pi\theta_Z/4) \text{ for } 50\theta_Z - 100 \leq t \leq 50\theta_Z + 100$$

$V_Z(t) = 0$ for all other values of $t$, where $t$ is measured in microseconds and $\theta_Z$ in degrees.

The shift registers selectively close terminals of switches 30–36 to simultaneously feed elements A, B, C and D for 50 microseconds, then to feed elements B, C, D and E for 50 microseconds, and so on until the last feed element W is reached. Thus controlled, these scan circuits provide continuously modulated power to each feed element of the bifocal pillbox antenna in a smooth sequential manner to provide continuous beam scanning at a rate of 20,000° per second. If the sequence is reversed and started at element W, the beam can be scanned in the reverse direction from 20° to 60°. As the clock controller and the scan circuitry are well known to those skilled in the art, further description is not deemed necessary. Those persons having a need for more information are referred to U.S. patent application Ser. No. 578,231, filed May 16, 1975 now U.S. Pat. No. 3,993,999.

Figure 3A:
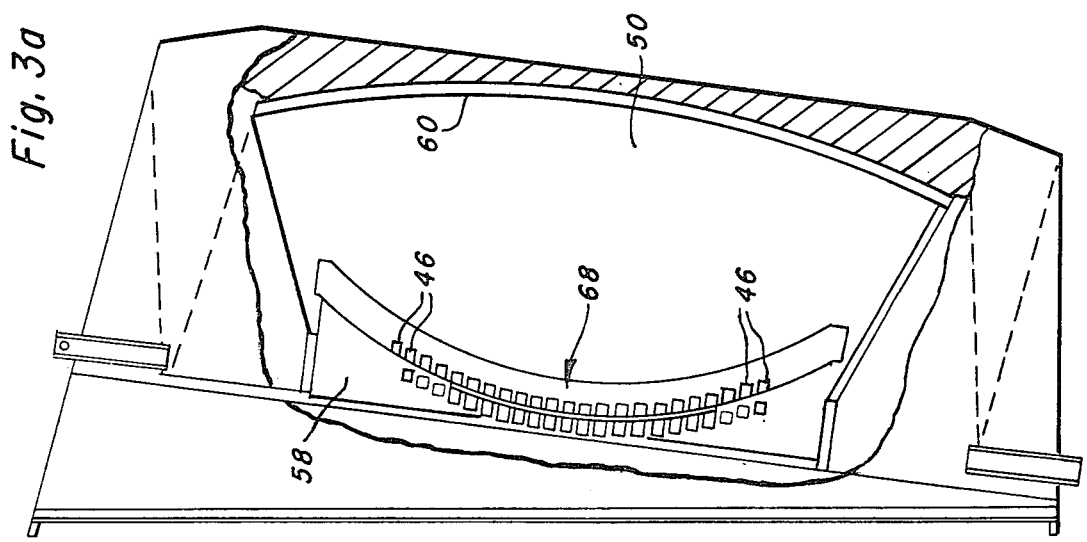
FIG. 3a shows a five flat panel with feed array bifocal pillbox antenna having a portion of the top panel broken away to reveal the interior of the first channel portion.

Referring to FIG. 3a, the bifocal pillbox antenna feed array, for example, comprises twenty-three feed elements A–W producing twenty-three beams.

The number of feed elements may vary to meet the scan range requirements of the continuous scanning beam. If too few feed elements are used, interfering energy patterns are formed which degrade desired radiation patterns. The feed elements are connected to the terminals of the single-pole-six-terminal switches 30–36 as follows: Elements A, E, I, M, Q, and U to switch 30; elements B, F, J, N, R and V to switch 32; elements C, G, K, O, S, and W to switch 34; and elements D, H, L, P, and T to switch 36. One terminal of switch 36 is not used.

Referring now to FIG. 4, in which is shown a representative element of the feed elements A through W and a cross section of the waveguide 42 for the bifocal pillbox antenna 18, each feed element has a mechanical attenuator 44 connected to a terminal of switches 30–36 and to feed probe 46. The mechanical attenuator trims the probe excitation amplitude. The desired phase of excitation of the probe is obtained by adjusting the length of the coaxial cable used to connect each of switches 30–36 to its attenuator. The feed probes 46 are coaxial connectors made by American Microwave Industries Inc. modified by attaching a brass sleeve 48 to the exposed inner conductor adjacent its end. The inner conductor and brass sleeve 48 form a radiating element in the waveguide 42. The waveguide 42 includes four channel portions 50, 52, 54 and 56, a ground plane bar 58, a sub-reflector 60, a straight reflector 62, a main reflector 64 and a plate horn 66. Channel portion 50 parallels channel portion 52 and has its end opposite the ground plane bearing end in communication with an end of channel portion 52. The sub-reflector 60 is mounted at the ends of channel portions 50 and 52. Channel portion 52 in turn parallels channel portion 54 and has its end opposite the sub-reflector end in communication with channel portion 54. The straight reflector 62 is mounted at this end of the channel portions 52 and 54. Channel portion 54 parallels channel portion 56 and has its end opposite the straight reflector in communication with channel portion 56. The main reflector 62 is mounted at this end of channels 54 and 56. The plate horn 66 (FIG. 6) is attached to flanges 57 (FIG. 4) of this end of channel portion 56 opposite the main reflector end.

The channel portions 50–56 are formed, for example, by a plurality of flat plates or panels 70. Each panel 70 is formed, for example, by bonding, using an epoxy adhesive, 1/16 inch thick aluminum sheets to sides of a ⅜ inch thick plastic honeycomb. To provide additional strength around the panel edges, ½ inch thick aluminum bars are positioned between adjacent aluminum panel sheets next to their edges. The panels are interleaved in a spaced relationship with every other plate, beginning with the first or top panel, having ends extending beyond corresponding ends of adjacent panels at one side, and opposite ends short of corresponding ends of the adjacent panels. In this arrangement, channel portions 50–56 are formed with one end of channel portion 56 closed by the ground plane; the 180° bend at the other end of channel 50 and adjacent end of channel portion 52 formed by the sub-reflector, straight reflector, and the 180° bend at the opposite end of channel portion 52 and adjacent end of channel portion 54 formed by the main reflector to provide a continuous passage from ground plane to the plate horn 66 (FIG. 6). The plate horn forms a radiating aperture. The desired mode of operating the antenna and the frequency determines the thickness of the waveguide channels. For example, for a TEM (transverse electric and magnetic mode) and a frequency of 5.188 GHz, the panels are spaced 0.5 inches apart; this spacing eliminates the propagation of higher order modes in the waveguide channel.

Referring again to FIG. 3a, the feed array 68 of twenty-three feed elements A–W is shown mounted in an arcuate shape on the top panel 70 of channel portion 50. The curvature of the feed array is that which provides the best focusing of each element and can be determined by selecting various feed locations and calculating the phase distribution of the radiation from the reflectors for that feed location. Best focusing is obtained when minimum deviation from a linear phase distribution is achieved. The X and Y coordinates for locating each feed probe in the example are set forth in Table I. Each probe 46 is mounted 0.57 inches in front of the ground plane bar 58. Ground plane bar 58, which may be constructed of aluminum, has outer edges corresponding to the shape of the end portion of penel 70 forming channel portion 50, a thickness corresponding to the channel thickness to close one end of channel portion 50, and an arcuate shaped interior edge surface forming the ground plane for the feed elements A–W. The curvature of the ground plane is derived from the polynominal equation as follows:

$$X = -0.94112355 + 0.118832666(10^{-6})\,Y^2 - 0.53259064(10^{-5})\,Y^4 + 0.42700350(10^{-8})\,Y^6$$

Y ranges from −30 inches to +30 inches, where X and Y values are in inches. The edges of the top panel 70 of channel portion 50 diverge from the points of intersection with the ground plane to the ends of the sub-reflector 60. The angle of divergence is that necessary to keep the channel edges out of the RF energy path. Sub-reflector 60 has outer surfaces contoured to form a 180° bend interconnecting channels 50 and 52 and a curved vertical surface. The curved vertical surface of the sub-reflector is obtained from the polynomial equation as follows:

$$X = 39.277466 - 0.17360330(10^{-2})Y^2 - 0.36936757(10^{-6})Y^4 + 0.58100011(10^{-10})Y^6$$

Y ranges from −45 inches to +45 inches.

To provide good transmission efficiency around the 180° bend, the corners of sub-reflector 60 are mitered as shown in FIG. 4.

The bottom panel 70 of channel portion 50 (FIG. 3b) comprises the top panel of channel portion 52. The edges of the panel 70 forming the top of channel portion 52 diverge from the ends of the sub-reflector 60 to the ends of straight reflector 62. Again the angle of divergence is that necessary to keep the channel edges out of the RF energy path. The straight reflector 62 is positioned to form a 180° bend between channel portions 52 and 54 at a distance approximately one half the distance between the sub-reflector 60 and main reflector 64. The corners of the straight reflector 62 are also mitered to provide good transmission around the 180° bend.

The bottom panel 70 of channel portion 52 is the top panel of channel 54 (FIG. 3C) and has diverging edges extending from the ends of the straight reflector 62 to the ends of the main reflector 64. Again the divergence angle is that necessary to keep the channel edges out of the RF energy path. Main reflector 64 has outer edges shaped to form a 180° bend interconnecting channel portions 54 and 56 and a curved interior surface. The contour of the main reflector 64 is derived from the polynominal equation as follows:

$$X = -38.255753 + 0.18550104(10^{-2})Y^2 \\ -0.6699391(10^{-8})Y^4 - 0.25855993(10^{-11})Y^6$$

$Y$ ranges from $-55$ inches to $+55$ inches.
The corners of the main reflector 64 are also mitered to provide good transmission around the 180° bend.

The bottom panel 70 of channel portion 54 forms the top panel of channel portion 56 (FIG. 3d) and diverging edges extend from the ends of the main reflector 64 to the plate horn forming the radiating aperture. The bottom panel 70 is shaped to correspond to that of the top panel 70 of channel portion 56.

Channel portions 50–56 are completed by mounting side bars between the channel-forming panels to close the spaces between adjacent panels. To maintain panel spacing plastic spacers may be inserted in the channel portions during fabrication. Also, a strip of RF energy absorbing material such as, for example, a carbon filled silicone compound is applied to the panels 70 adjacent the side bars to absorb any spillover energy radiating into the side bars. Absorption of spillover energy substantially reduces interference with desired energy transmission.

The two specially shaped reflectors 60 and 64 provide two focal points. The mathematical technique for synthesizing the reflector shapes to provide bifocal operation is described by Rao in "Bifocal Dual Reflector Antenna," IEEE Transactions on Antennas and Propagation, Vol. AP-22, No. 5, September, 1974, pp. 711–714. To determine reflector shapes for a bifocal pillbox antenna, the same synthesis mathematics is used, but only a strip corresponding to a central slice of the three-dimensional reflector is used.

FIG. 5 is a chart showing the geometry of the feed array and two reflectors. For these reflector shapes the two focal points are at 5.25° either side of the centerline of the two reflectors. To optimize performance of te bifocal pillbox antenna over the 0° to 20° scan range, the two reflectors and the feed array are inclined 7.5° with respect to the radiating aperture.

Referring now to FIG. 6, the parallel plate horn 66 is attached to the open end of channel 56 to form the radiating aperture of the antenna. The parallel plate horn 66 provides a matched transition to free space. The configuration of the horn determines the shape of the azimuth pattern. To provide an azimuth beam shape with additional center line amplitude emphasis over that of an ordinary horn, a two-section horn with a double flare is utilized. The horn 66 comprises two flat plates 76 and 78 shaped to provide parallel portions with end flanges 77 for attachment to the corresponding flanges 57 of the panels of channel 56, first diverging portions 80 for the first section, short off-sets 82, and second diverging portions 84 for the second section. The first and second section portions 80 and 84 of plates 76 and 78 diverge at preselected angles $L_1$ and $L_2$.

In the preferred embodiment the antenna operates with a TEM mode and the radiated polarization is horizontal when the radiating aperture is vertically disposed. If vertical polarization is required, a polarizer 86 is mounted in front of the radiating horn 66. A suitable polarizer is the Lerner polarizer described in "A Wave Polarization Converter for Circular Polarization," IEEE Transactions on Antennas and Propagation, Vol. A p-13. The polarizer comprises a plurality (six) of layers of copper-clad fiber glass which have been etched to form a pattern of copper rectangles and lines. The plurality of layers are spaced apart by plastic honeycomb blocks. In operation a first portion 3 of the plurality of copper etched fiber glass plates converts the horizontal polarization to circular polarization and a second portion (3) thereof converts the circular polarization to the desired vertical polarization.

It will be appreciated by those skilled in the art that as a minimum, the bifocal pillbox antenna can be formed using two shaped reflectors, four flat panels, and the feed array. In such a configuration the reflectors also serve as 180° parallel plate waveguide bends. To reduce the size of the antenna one or more straight reflectors can be used as in the example.

In operation the controller 38 simultaneously closes terminals of switches 30–36 to energize simultaneously feed elements A, B, C and D. At 0° elevation element A is at the $-6$dB level and falling, element B is at the 0dB level and falling, element C is at the $-6$dB level and rising, and element D is at the $-30$dB level and rising. At 1° elevation element A is turned off, element B is at the $-6$dB level and falling, element C is at the 0dB level and falling, element D is at the $-6$dB level and rising, and element E has been turned on and is at the 30 dB level and rising. With any three adjacent feed elements excited simultaneously with relative power levels of $-6$dB, 0dB and $-6$dB a beam with a 1.5° beamwidth and $-24.5$dB or better sidelobes is radiated. This is to be contrasted with the situation where if only one element were energized the antenna would radiate a beam having a beamwidth of 1.123° and sidelobe levels of $-13$ db. The pointing angle of each beam is given in Table I. Table I also shows the phase of excitation of each feed element 46. The proper phase relation between succeeding excited feeds is critical when several (four) feed elements are excited simultaneously. With the feed array and two reflectors designed to provide two off-center focal points the energy waves generated at the probes radiate in all directions with that portion striking the ground plane being reflected toward the sub-reflector. The sub-reflector reflects the energy waves with a substantially larger radius than that of the received waves to the main reflector. The energy waves reflected by the main reflector are substantially straight or linear waves.

TABLE I

| PROBE | Y LOCATION (INCHES) | X LOCATION (INCHES) | BEAM ELEVATION ANGLE (POINTING ANGLE) | | PHASE OF EXCITATION | |
|---|---|---|---|---|---|---|
| A | 13.903 | 1.1780 | −1 | degrees | −275.51 | degrees |
| B | 12.305 | 0.7432 | 0 | " | −219.16 | " |
| C | 10.693 | 0.3486 | 1 | " | −167.88 | " |
| D | 9.069 | −0.0015 | 2 | " | −122.22 | " |
| E | 7.435 | −0.3025 | 3 | " | −82.85 | " |
| F | 5.792 | −0.5499 | 4 | " | −50.40 | " |
| G | 4.142 | −0.7396 | 5 | " | −25.48 | " |
| H | 2.487 | −0.8681 | 6 | " | −8.55 | " |
| I | 0.829 | −0.9330 | 7 | " | 0.0 | " |
| J | −0.829 | −0.9330 | 8 | " | 0.0 | " |
| K | −2.487 | −0.8681 | 9 | " | −8.55 | " |
| L | −4.142 | −0.7396 | 10 | " | −25.48 | " |
| M | −5.792 | −0.5499 | 11 | " | −50.40 | " |
| N | −7.435 | −0.3025 | 12 | " | −82.85 | " |
| O | −9.069 | −0.0015 | 13 | " | −122.22 | " |
| P | −10.693 | 0.3486 | 14 | " | −167.88 | " |
| Q | −12.305 | 0.7432 | 15 | " | −319.16 | " |
| T | −13.903 | 1.1780 | 16 | " | −275.51 | " |
| D | −15.487 | 1.6495 | 17 | " | −336.44 | " |
| Y | −17.056 | 2.1554 | 18 | " | −401.66 | " |
| U | −18.608 | 2.6949 | 19 | " | −471.13 | " |
| V | −20.145 | 3.2691 | 20 | " | −545.08 | " |
| W | −21.664 | 3.8812 | 21 | " | −634.40 | " |

Elevation patterns for the bifocal pillbox antenna of the example were calculated for 0°, 3°, 5°, 10°, and 15° and are shown in FIGS. 7a - e. Comparison of the calculated elevation patterns with those measured for 0°, 2.8°, 5°, 10° and 15° of the example bifocal pillbox antenna reveals that they are substantially identical.

FIG. 9 illustrates how the bifocal pillbox antenna 18 is used to feed a cylindrical reflector 88 to achieve a narrow radiation pattern in another plane.

Although several embodiments of the invention have been described herein, it will be apparent to a person skilled in the art that various modifications to the details of construction shown and described may be made without departing from the scope of this invention.

What is claimed is:

1. An antenna system comprising:
   (a) a controller means for forming control voltages and sequential switching signals;
   (b) a plurality of scan circuits connected to said controller means for producing RF energy power level outputs in response to said control voltages and sequential switching signals;
   (c) a contoured feed array having a plurality of feed elements connected to said scan circuits, said plurality of feed elements being sequentially energized in response to the outputs of said scan circuits to radiate RF energy having a non-linear phase distribution; and
   (d) a waveguide means connected to said contoured feed array, said waveguide means comprising a plurality of spaced interleaved panels with ends staggered to provide a continuous waveguide having a plurality of stacked portions and including a ground plane bar mounted behind said contoured feed array, a waveguide having a radiating aperture and a plurality of selectively shaped reflectors, said shaped reflectors providing a plurality of focal points having a desired spacing, said plurality of selectively shaped reflectors being mounted in said waveguide intermediate said radiating aperture and said contoured feed array whereby the RF energy radiating from selected feed elements with a non-linear phase distribution is channeled to said plurality of selectively shaped reflectors having said plurality of focal points and reflected with a substantially linear phase distribution and transmitted.

2. An antenna system according to claim 1, wherein said waveguide means further includes a parallel plate horn forming a radiating aperture for said waveguide.

3. An antenna system according to claim 2, wherein said parallel plate horn comprises a plurality of beam pattern-forming sections.

4. An antenna system according to claim 1, further comprising a polarizer operative responsively to RF energy radiating from said waveguide in one polarized form to change the polarization form.

5. An antenna system according to claim 4, wherein said polarizer comprises a first section and a second section polarizer, each section consisting of copper clad fiberglass sheets etched to form a plurality of spaced copper polygons spaced from copper lines and mounted upon honeycombed, epoxy slots whereby the polarization of the radiating energy is changed in turn from one coordinate type to a circular polarization, and to a different coordinate type.

6. An antenna system according to claim 1, wherein said contoured feed array and plurality of selectively shaped reflectors are angularly positioned with respect to said waveguide radiating aperture.

7. An antenna system according to claim 1, further comprising a straight reflector mounted in said waveguide in operative association with said plurality of selectively shaped reflectors.

8. An antenna system according to claim 6, wherein the angle of the angular position of said contoured feed array and plurality of reflectors with respect to said radiating aperture is about one-half the angular scan.

9. An antenna system according to claim 1, wherein said plurality of reflectors are selectively shaped to provide two focal points selectively spaced one from the other to provide desired beamwidth and worst case sidelobes in the region between the focal points.

10. An antenna system according to claim 1, wherein said plurality of selectively shaped reflectors are also shaped to provide bends in the waveguide.

11. An antenna system according to claim 1 wherein one of said plurality of selectively shaped reflectors is mounted at the juncture of the first and second stacked waveguide portions to reflect energy from said first portion into said second portion while partially focusing the energy and a second of said plurality of selectively shaped reflectors is mounted at the juncture of said second and third stacked waveguide portions for reflecting energy from said second portion down said third portion while substantially focusing the energy for transmission.

12. An antenna system according to claim 1, further comprising a straight reflector shaped to form a bend, said straight reflector being mounted at the juncture of the ends of those waveguide portions having said selectively shaped reflector bearing ends to reduce the length of each waveguide portion.

13. An antenna system according to claim 1, wherein said panels forming said waveguide comprise two aluminum sheets bonded to an epoxy honeycomb.

14. An antenna system according to claim 1, wherein said contoured feed array comprises a selected number of feed elements mounted with their probes selectively spaced one to another within the waveguide to provide a desired angular scan.

* * * * *